United States Patent
Kawabe et al.

[11] Patent Number: 5,873,587
[45] Date of Patent: Feb. 23, 1999

[54] FRONT SUSPENSION SYSTEM FOR AUTOMOTIVE VEHICLE

[75] Inventors: Yoshihiro Kawabe; Takuya Murakami; Takao Kuno, all of Kanagawa, Japan

[73] Assignee: Nissan Motor Co., Ltd., Yokohama, Japan

[21] Appl. No.: 818,282

[22] Filed: Mar. 17, 1997

[30] Foreign Application Priority Data

Mar. 15, 1996 [JP] Japan ................................. 8-059220

[51] Int. Cl.$^6$ .............................. B60G 3/20; B60G 15/07
[52] U.S. Cl. ......................... 280/124.135; 280/124.138; 280/124.145
[58] Field of Search .................... 280/663, 666, 280/667, 668, 670, 673, 675, 690, 691, 696, 701, 726, 124.135, 124.136, 124.138, 124.139, 124.142, 124.145, 124.146, 124.154

[56] References Cited

U.S. PATENT DOCUMENTS

| | | | |
|---|---|---|---|
| 3,992,036 | 11/1976 | Allison | 280/695 |
| 4,033,605 | 7/1977 | Smith et al. | 280/664 |
| 4,105,222 | 8/1978 | Buchwald | 280/668 |
| 4,753,455 | 6/1988 | Murakami et al. | 280/663 |
| 4,875,703 | 10/1989 | Murakami | 280/663 |
| 5,375,870 | 12/1994 | Smith et al. | 280/668 |

FOREIGN PATENT DOCUMENTS 5-178041  7/1993  Japan .

*Primary Examiner*—Peter C. English
*Attorney, Agent, or Firm*—Foley & Lardner

[57] ABSTRACT

According to a front suspension system, an upper control arm or link is pivoted at an inner end to a suspension member that is connected to a side rail. The upper link extends below the side rail and is connected at an outer end to a rotary joint receiving an upper edge portion of a knuckle. A lower control arm or link is pivotally mounted at two split distance inner ends to the suspension member and extends below the upper link, At an outer end portion, the lower link pivotally supports a lower edge portion of the knuckle. The rotary joint pivotally supports a bracket that holds a lower end portion of a shock absorber of a strut. The rotary joint has a joint axis that has an extension passing through a portion at which the lower edge portion pivots on the lower link. The upper link has a link axis that intersects the joint axis and an intermediate portion spaced along a longitudinal axis of the vehicle from the link axis. The upper link is normally held, with a predetermined rigidity, in a predetermined positional relationship with the link axis.

16 Claims, 7 Drawing Sheets

FRONT SUSPENSION SYSTEM FOR AUTOMOTIVE VEHICLE

BACKGROUND OF THE INVENTION

1. Field of the Invention

The present Invention relates to a front suspension system for an automotive vehicle.

2. Description of the Related Art

JP-A 5-178041 describes a front suspension system. In this suspension system, a knuckle, serving as a wheel carrier, is connected at a lower edge portion thereof to a vehicle body via a lower arm. At an upper edge portion thereof, the knuckle is connected to the vehicle body via a rotary joint and an upper arm. The upper arm is pivotally connected at a single end to the vehicle body. The upper arm is bifurcated to form two split ends. At these split ends, the upper arm is pivotally connected to the rotary joint. The rotary joint has a site and supports at this site the lower end of a strut, At the lower edge thereof, the knuckle is pivotal relative to the lower arm. The rotary joint receives the upper edge of the knuckle so that the knuckle can rotate about a joint axis. This known suspension system can exhibit the merits of a suspension system of the strut type as well as the merits of a suspension system of the double-wishbone type.

With due regard to the durability of bushing at which the upper arm is mounted to the vehicle body, the suspension system of this type requires a relatively long upper arm for proper variation of alignment such as camber variation with wheel stroke. In order to obtain this relatively long dimension of the upper arm, it is necessary that the upper arm extend below side rail of an automotive vehicle into the engine compartment to attach the inner end of the upper arm to an appropriate location within the engine compartment. In the case of an automotive vehicle of the front-engine-mount front-drive type, there is a drive shaft below the upper arm in addition to the side rail and bushing at the lower end of the strut, which are disposed above the upper arm. Thus, it is difficult to find spaces above and below the upper arm for allowing movement of the upper arm during the wheel stroke.

An object of the present invention is to provide a front suspension system of the type including an upper arm or link, which ensures sufficiently large wheel stroke.

SUMMARY OF THE INVENTION

According to the present invention, there is provided a front suspension system for an automotive vehicle having a predetermined member, comprising:

a wheel support member carrying a wheel;

a lower link pivotally mounted to the predetermined member and connected at an outer end portion thereof to said wheel support member at a lower edge portion thereof for allowing pivotal motion of said wheel support member relative to said lower link;

a rotary joint coupled with said wheel support member at an upper edge portion thereof, said rotary joint having a joint axis of rotation;

a shock absorber connected at a lower end portion thereof to said joint; and an upper link connected at one end portion thereof to the predetermined member and connected at the opposite end portion thereof to said joint, said upper link having a link axis that crosses said joint axis, said upper link being spaced along a longitudinal axis of the vehicle from said link axis, said upper link being normally held, with a predetermined rigidity, in a predetermined positional relationship with said link axis, said upper link being movable to shift out of said predetermined positional relationship to allow said link axis to move beyond limits set by said predetermined positional relationship.

According to a specific aspect of the present invention, there is provided a front suspension system for an automotive vehicle including a side rail and a suspension member connected to the side rail and extending laterally inwards of the vehicle. In the front suspension system there are provided:

a wheel support member having an upper edge portion and a lower edge portion;

a lower link pivotally mounted to the suspension member and extending below the side rail laterally outwards, said lower link having an outer end portion, said lower link being connected at said outer end portion thereof to said lower edge portion of said wheel support;

a rotary joint coupled with said upper edge portion of said wheel support member;

an upper link having an inner end portion and an outer end portion, said upper link being pivotally mounted at said inner end portion thereof to said suspension member, said upper link extending below said side rail laterally outwards, said upper link being connected at said outer end portion thereof to said rotary joint;

said upper link having an intermediate portion interconnecting said inner end portion thereof and said outer end portion thereof, said intermediate portion being spaced along a longitudinal axis of the vehicle from an upper link axis said upper link being spaced along a longitudinal axis of the vehicle from said joint axis, said upper link being normally held, with a predetermined rigidity, in a predetermined positional relationship with said link axis, said upper link being so arranged as to come into abutting engagement with said side rail and urged to pivot about said link axis to allow said link axis to move beyond limits set by said predetermined positional relationship.

DESCRIPTION OF THE PREFERRED EMBODIMENT

Figure 1:
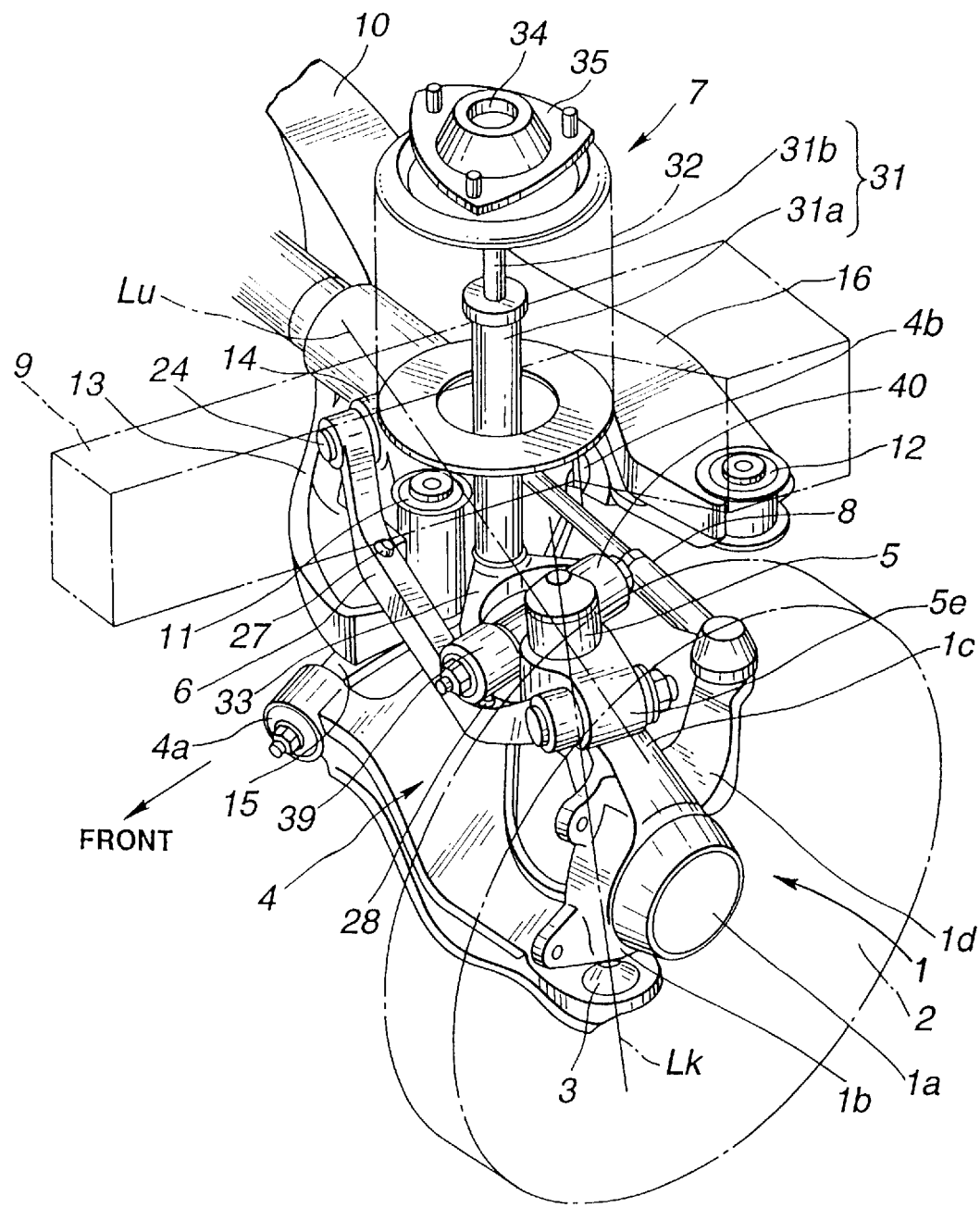
FIG. 1 is a perspective view of a left half of a preferred embodiment of an independent front suspension system according to the present invention.

FIG. 1 shows a left half of a front independent suspension of an automotive vehicle. In FIG. 1, the reference numeral 1 designates a knuckle serving as a wheel support for a front wheel 2. The knuckle 1 supports at a central hub portion 1a an axle of the wheel 2 for rotation relative thereto. At a lower edge portion 1b thereof, the knuckle 1 is connected via a ball joint 3 to a lower arm or link 4. At an upper edge portion 1c thereof, the knuckle 1 is connected, via a rotary joint 5, to an upper arm or link 6 and also to a lower end of a strut 7. The knuckle 1 has an integral arm 1d extending from the central hub portion 1a rearward and inward. At the integral arm 1d, the knuckle 1 is connected to a tie rod 8.

In a conventional manner, a pair of left and right side rails or members extent in a longitudinal direction of the vehicle. In FIG. 1, the broken line at reference numeral 9 illustrates the left side rail. The reference numeral 10 designates a suspension member extending laterally between the side rails. The suspension member 10 is connected, at one end portion, to the lower surface of the right side rail via two bushings, not shown, and it is connected, at the opposite end portion, to the lower surface of the left side rail 9 via two bushings 11 and 12.

Figure 3:
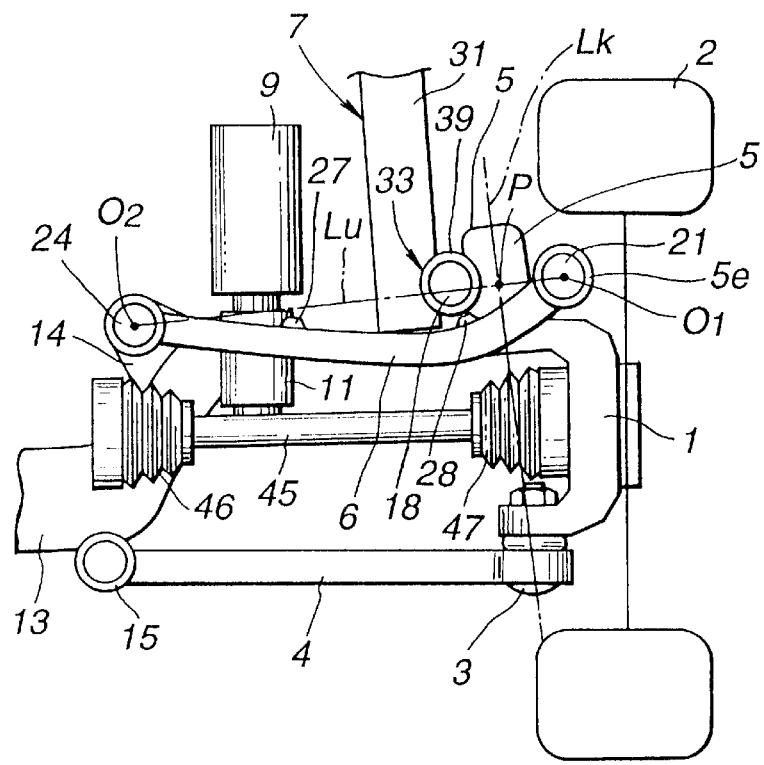
FIG. 3 is a schematic front elevation of the suspension of FIG. 1.

The suspension member 10 is bifurcated at the one end portion into two legs, which are mounted to the lower surface of the right side rail via the two bushings, respectively. As shown in FIG. 1, at the opposite end portion, the suspension member 10 is bifurcated into two legs, namely a front leg 13 and a rear leg 16. The rear leg 16 is mounted to the lower surface of the left side rail 9 via the bushing 12. As best seen in FIG. 3, the front leg 13 is curved upward towards the lower surface of the left side rail 9 and mounted thereto via the bushing 11. The suspension member 10 has a support 14 for the upper link 6 at a location laterally inward of the bushing 11 on an upper surface of the front leg 13. Further, the suspension member 10 has a support 15 for the lover link 4 at a location laterally inward of the front leg 13 on a lower surface thereof.

The lower link 4, which extends laterally with respect to the longitudinal axis of the vehicle, is connected at an outer end thereof to the lower edge portion 1b of the knuckle 1 via the ball joint 3. The lower link 4 has at two split ends thereof two aligned bushings 4a and 4b. A suitable fastener extends through the bushing 4a, the support 15 of the suspension member 10 and the bushing 4b. The bushings 4a and 4b are spaced from each other so as to allow movement of the lower link 4 during bounding and rebounding of the wheel 2. This arrangement restrains movement of the lower link 4 along the longitudinal axis of the vehicle.

Figure 4:
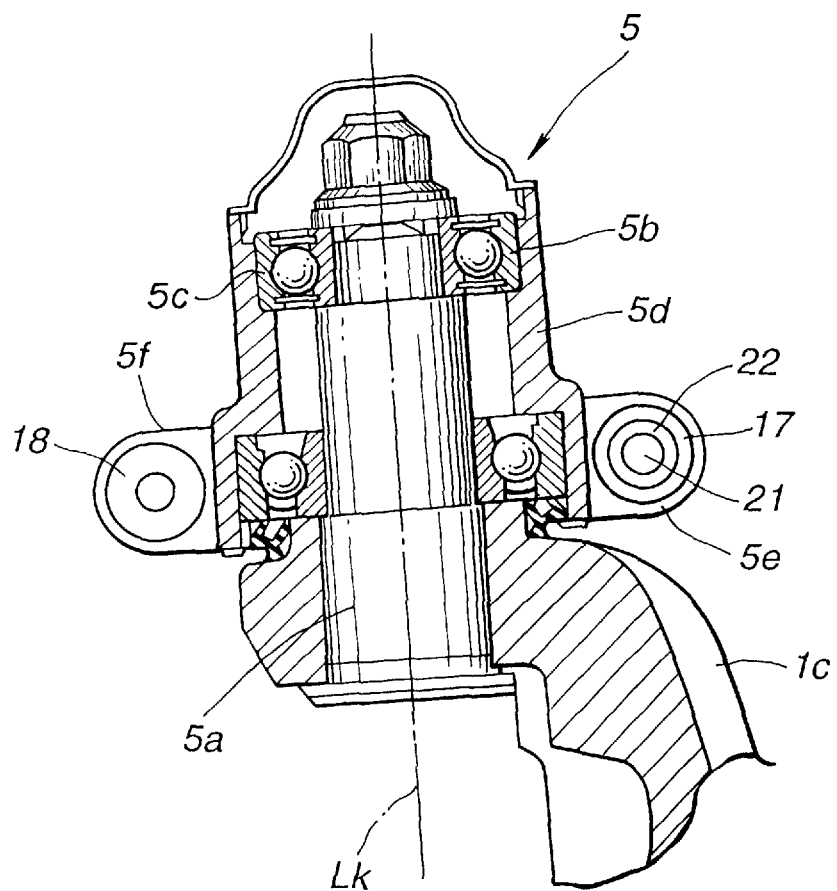
FIG. 4 is a fragmentary section, magnified in scale, of the suspension of FIG. 1 illustrating a rotary joint receiving an upper edge portion of a knuckle.
Figure 5:
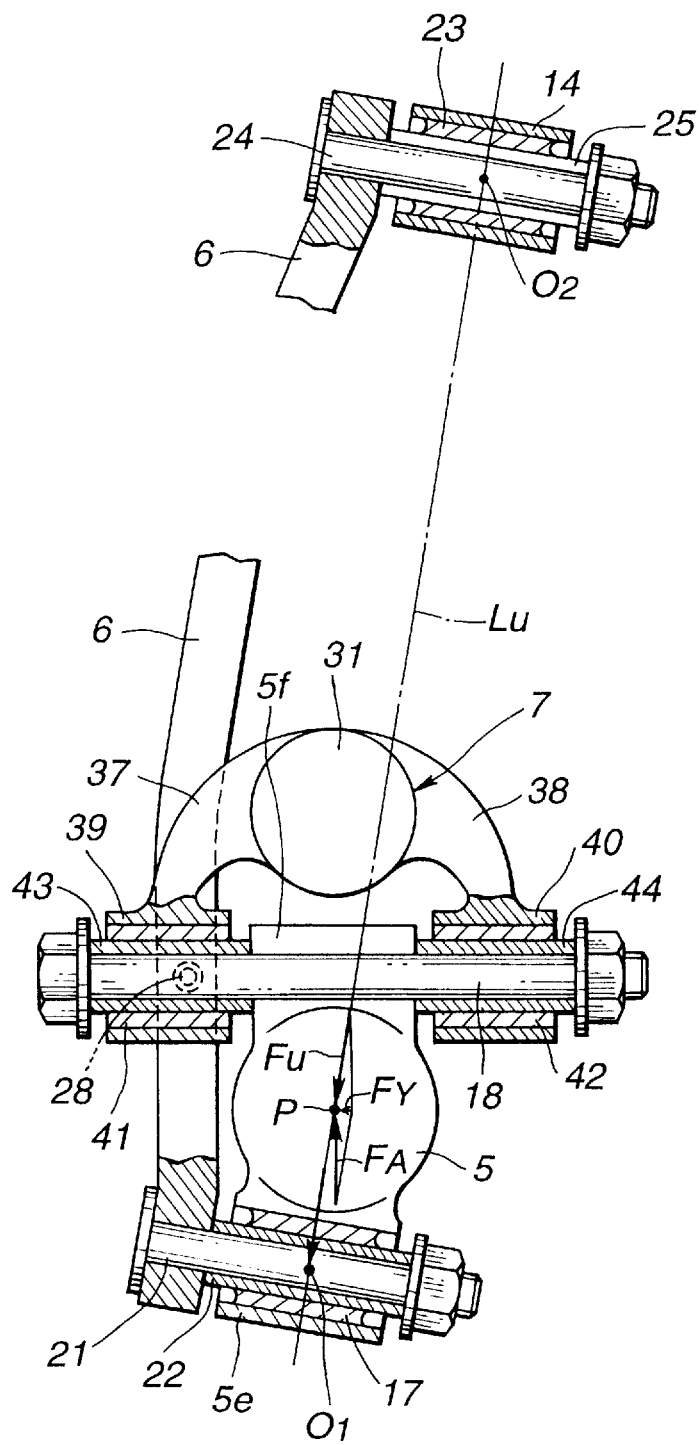
FIG. 5 is a top plan view of the suspension of FIG. 1 illustrating the interconnection between an upper arm or link, rotary joint and suspension member.

Referring to FIG. 4, the knuckle 1 has at the upper edge portion 1c thereof an integral differential diameter support pin 5a. The joint 5 includes a cap-like sleeve 5d receiving therein the support pin 5a via bearings 5b and 5c. The axis of rotation of the support pin 5a is aligned with a kingpin axis $L_K$ passing through the center of the ball joint 3. The cap-like sleeve 5d has an integral support sleeve 5e that supports an outer end of the upper link 6 and an integral support sleeve 5f that is used to support the strut 7. As best seen in FIG. 5, the support sleeve 5e is disposed in a plane that is horizontal with respect to the vehicle or almost horizontal. It is oriented so that an axis thereof is at right angles to an axis $L_U$ of the upper link 6, which axis will be later described. The support sleeve 5e has mounted therein a resilient bushing 17 that supports the outer end of the upper link 6. The support sleeve 5f is oriented so that an axis thereof is parallel to or almost parallel to the longitudinal axis of the vehicle. Through the support sleeve 5f, a support pin 18 extends with opposite end portions thereof projected from opposite ends of the support sleeve 5f. This support pin 18 is used to support the strut 7.

As shown in FIG. 5, the upper link 6 is of the single link structure terminating, on one hand, at the outer end and, on the other hand, at the inner end, Each of the outer and inner ends of the upper link 6 is single and thus not split. A mounting pin 21 extends through the outer end portion of the upper link 6 and an inner collar 22 that is surrounded by the bushing 17 and it is held in appropriate position by a nut. A mounting pin 24 extends through the inner end portion of the upper link 6 and through an inner collar 25 that is surrounded by a resilient bushing 23 that is in turn surrounded by the support 14. The mounting pin 24 is held in appropriate position by a nut.

Figure 2:
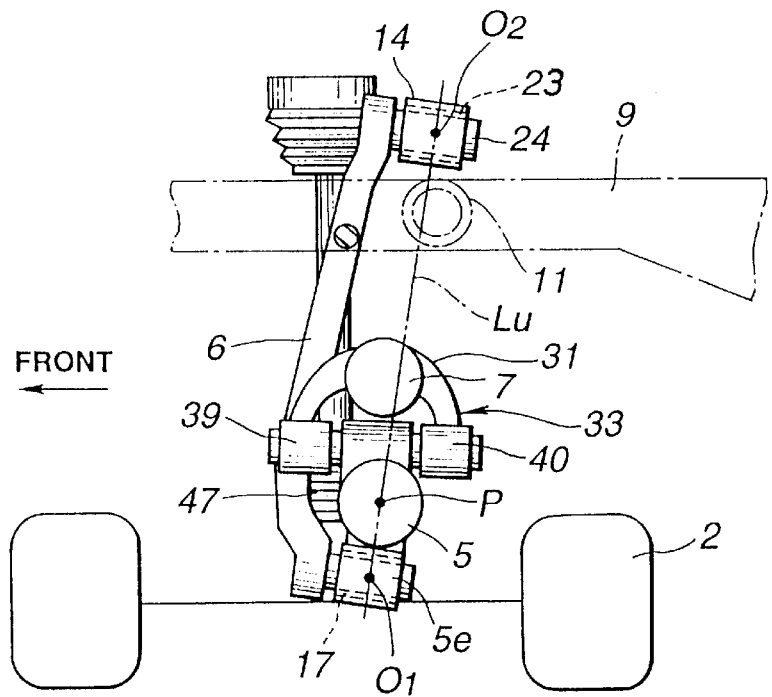
FIG. 2 is a schematic top plan view of the suspension of FIG. 1.

Referring to FIGS. 2, 3 and 5, the reference characters $O_1$ and $O_2$ designate pivot centers of the resilient bushings 17 and 23, respectively. The pivot centers $O_1$ and $O_2$ are located on center axes of the bushings 17 and 23, respectively, and equidistant from the opposite ends of the corresponding one of them. Theoretically, the pivot center of a resilient bushing is located at a point that is immobile when the bushing is subject to various kinds of torque. The before mentioned axis $L_U$ of the upper link 6 is defined as a line interconnecting these pivot is centers $O_1$ and $O_2$. The bushings 17 and 23 are arranged such that extension of the upper link axis $L_U$ crosses the extension of the kingpin axis $L_K$. Preferably, the upper link axis $L_U$ intersects the extension of the kingpin axis $L_K$ at a point P.

The arrangement of the upper link 6 is explained. As readily seen from FIGS. 2 and 5, the upper link 6 is disposed forward of with respect to the forward direction of the vehicle, the upper link axis $L_U$. In other words, the upper link 6 is spaced or offset forward of the upper link axis $L_U$. With the outer end disposed forward of the inner end, the upper link 6 extends from the outer end thereof inward and slightly rearward to the inner end. Referring also to FIG. 3, the upper link 6 extends below the side rail 9 and below a support sleeve 39 of a mounting bracket 33 of the strut 7. This mounting bracket 33 is described later. The outer end of the upper link 6 is pivotally connected to the joint 5 at a portion laterally inward of the wheel 2. This arrangement of the upper link 6 provides a space wide enough for the upper link 6 to move to allow sufficiently long stroke of the wheel 2.

The upper link 6 has on an upper surface thereof an elastic damper 27 opposed to the side rail 9 and another elastic damper 28 opposed to the support sleeve 39 of the bracket 33. Each of the elastic dampers 27 and 28 is in the form of a trapezoid and each is made of rubber.

The strut 7 is composed of a shock absorber 31 and a spring 32 surrounding the shock absorber 31. The shock absorber 31 includes a cylinder tube 31a arid a piston rod 31b projecting out of the cylinder tube 31a. The bracket 33 is fixedly attached to the cylinder tube 31a at its lower end. At an upper end thereof, the piston rod 31b is attached via a rubber mounting 34 and an attachment plate 35 to a member on the vehicle body side, not shown.

Figure 6:
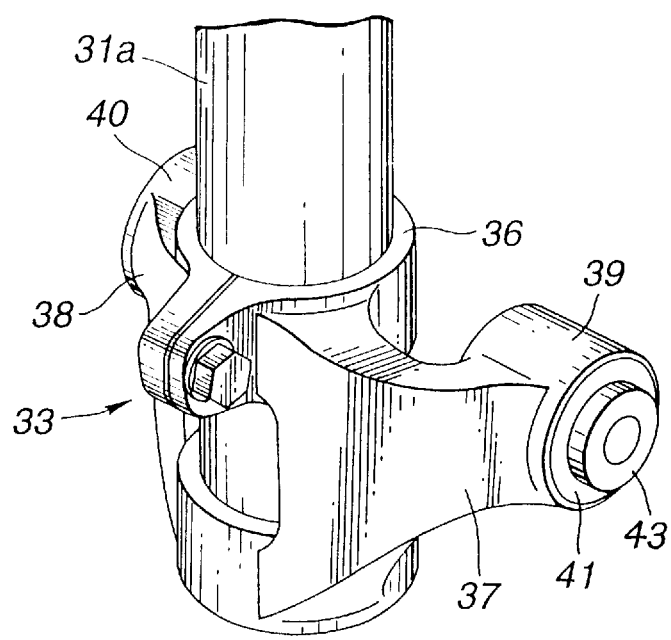
FIG. 6 is a fragmentary view, magnified in scale, of the suspension of FIG. 1 illustrating a bracket for a strut in the form of a damper or shock absorber.

Referring to FIG. 5 and 6, the mounting bracket 33 includes a split collar 35 holding the lower end portion of the shock absorber 31. Two arm portions, namely a front arm portion 37 and a rear arm portion 38, extend from the split collar 36 toward the joint 5. The arm portions 37 and 38 terminate in two aligned distant support sleeves 39 and 40, respectively. The sleeves 39 and 40 receive resilient bushings 41 and 42, respectively. Inner collars 43 and 44 are inserted into the resilient bushings 41 and 42, respectively.

The openings of the inner collars 43 and 44 and an opening of the support sleeve 5f of the joint 5 are aligned to receive a mounting pin 18. This arrangement permits pivotal notion of the bracket 33 relative to the joint 5 about the pin 18. This pin 18 is almost parallel to the longitudinal axis of the vehicle.

The tie rod 8 is connected to a steering gear, not illustrated. In FIG. 3, the reference numeral 45 designates a drive shaft for driving the front wheel 2. At an inner end thereof, the drive shaft 45 is connected via a joint 46 to a final gearing. At an outer end thereof, the drive shaft 45 is connected via a joint 47 to the front wheel 2.

The embodiment is further described.

Viewing from the front of the vehicle, the lower link 4 and the upper link 6 cooperate to control movement of the knuckle 1 as shown in FIG. 3 thereby producing characteristics of a suspension of the double-wishbone type. Viewing the vehicle from the side, the lower link 4 and the strut 7 cooperate to control movement of the knuckle 1 thereby producing characteristics of a suspension of the strut type.

Thus, when the wheel 2 strokes, the knuckle 1 is controlled in the manner as it is controlled by a suspension of the double-wishbone type as viewed from the front of the vehicle. Viewing from the side of the vehicle, the knuckle 1 is controlled in the same manner as it is controlled by a suspension of the strut type.

Let us now consider the behavior of the embodiment of the front suspension when the front wheel 2 is subject to external forces.

When the front wheel 2 is subjected to an input force oriented in a longitudinal direction of the vehicle, the lower link 4 and the strut 7 control movement of the knuckle 1 thereby allowing the front suspension to function as the strut type. Applying a lateral force to the front wheel 2 causes the front suspension to function as the double-wishbone type wherein the lower link 4 and the upper link 6 control movement of the knuckle 1.

When the front wheel 2 is subject to a lateral force oriented inward of the vehicle during turning maneuvers of the vehicle, the knuckle 1 is subject to this force. Under this condition, knuckle 1 tends to move laterally inward of the vehicle. The lower link 4 restricts movement of the lower edge portion 1b of the knuckle 1. Transmission of force through the upper edge portion 1c of the knuckle 1 to the joint 5 causes the knuckle 1 to apply force $F_A$ to the kingpin axis $L_K$ as shown in FIG. 5. The application of this force $F_A$ will not induce any reaction force by the strut 7 because the mounting pin 18 is parallel to the longitudinal axis of the vehicle.

However, the application of force causes the upper link 6 to produce a large reaction force $F_U$ on the upper link axis $L_U$ against the force $F_A$. The upper link 6 is connected at one end point to the joint 5 and at the opposite end point to the suspension member 10 and the link axis $L_U$ intersects the extension of the kingpin axis $L_K$ at the point P. Owing to this arrangement, there is applied to the upper link 6 a compression force or tension force since forces due to stress by the resilient bushings 17 and 23 are negligible. There occurs no moment about the kingpin axis $L_K$ tending to rotate the joint 5. The only force that is applied to the joint 5 is a longitudinal force $F_Y$ that is induced owing to oblique arrangement of the link axis $L_U$. The strut 7 controls movement of the joint 5 due to this longitudinal force $F_Y$. Thus, this arrangement permits a single connection point between the upper link 6 and the joint 5 without any deterioration in camber rigidity and lateral rigidity.

Normally, the mounting pin 18 is parallel to the vehicle longitudinal axis. This arrangement permits the strut 7 to withstand stress due to input force to the joint 5 via the integral differential diameter support pin 5a of the knuckle 1 when the front wheel 2 is subject to a vehicle longitudinal force. This prevents the knuckle 1 from moving in the vehicle longitudinal direction. If the strut 7 and the joint 5 should rotate about the kingpin axis $L_K$, the upper link 6 would resist such movements.

As described before, the outer end of the upper link 6 is connected to the integral support sleeve 5e that is disposed laterally outwards of the cap-like sleeve 5d of the joint 5. This arrangement allows use of an upper ink with increased length. This is effective in enhancement of rigidity of bushings. This makes it possible to provide a linear camber variation.

The support sleeve 5e has an axis at right angles to the link axis $L_U$. Owing to this arrangement, the amount of deformation of the resilient bushing 17 is small when the upper link 6 is subject to compression or extension force. Thus, the camber rigidity and lateral rigidity can be balanced appropriately.

As long as the upper link 6 does not interfere with the side rail 9, a vertically upward force that is applied to the knuckle 1 when the front wheel 2 is subject to a bound force is balanced with a reaction force by the strut 7. Torque induced due to offset of the strut 7 from the kingpin axis $L_K$ is absorbed by inertia of the knuckle 1, which is coupled at the differential diameter support pin 5a with the joint 5, about the kingpin axis $L_K$. Small torque tending to cause the joint 5 to rotate about the kingpin axis $L_K$ is balanced with reaction force induced at the upper link 6.

Figure 7:
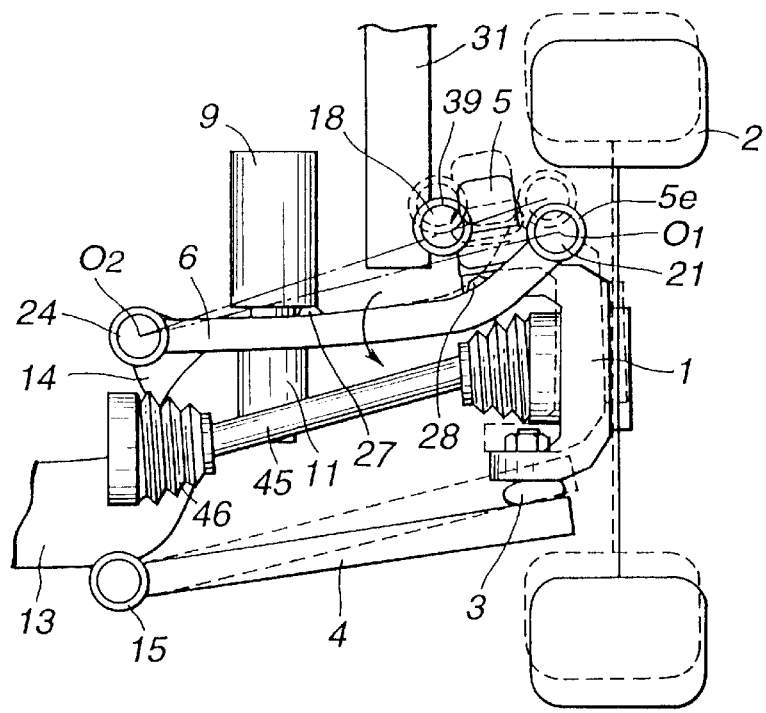
FIG. 7 is a similar view to FIG. 3 illustrating the position of parts when the wheel bounds.
Figure 8:
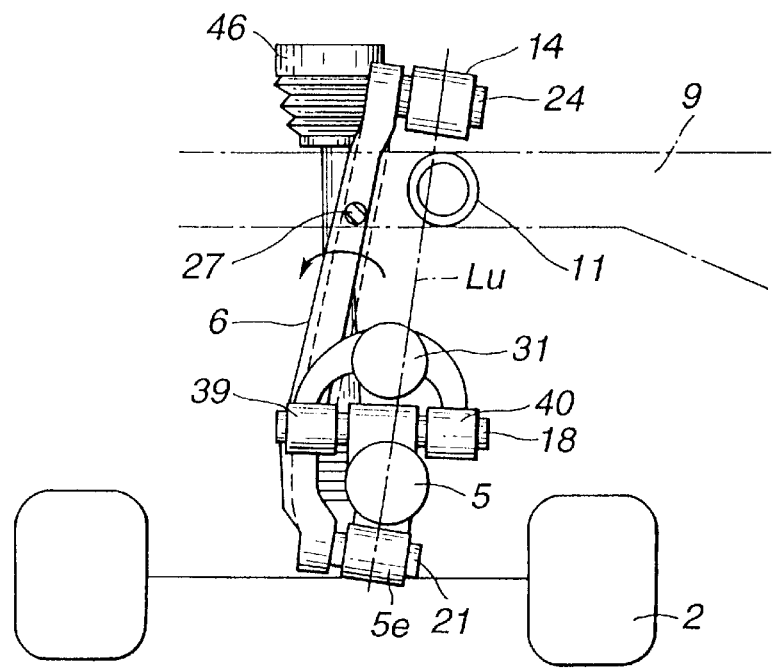
FIG. 8 is a similar view to FIG. 2 illustrating the position of parts when the wheel bounds.
Figure 9:
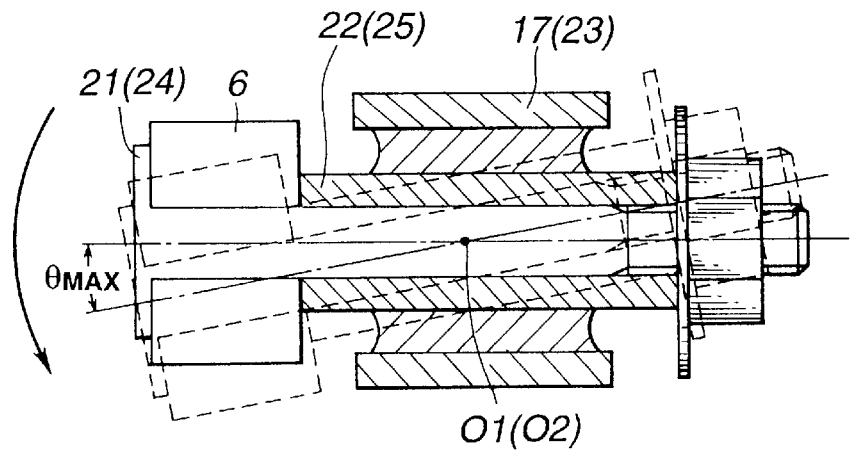
FIG. 9 is an enlarged section of a resilient bushing of the upper arm.

Let us now consider the case where the upper link 6 comes into interference with the side rail 9 when the magnitude of hound force applied to the front wheel 2 is great. In this case, after the upper link 6 has come into abutting engagement with the side rail 9, the resiliency of the bushings 17 and 23 allows the link axis $L_U$ to lift further thereby securing sufficiently long wheel stroke. FIGS. 7 to 9 illustrate in the fully drawn line the position of parts when the upper link 6 is about to abut the side rail 9. In each of these Figures, the upper link 6 pivots about the link axis $L_U$ in a direction as indicated by an arrow thereby allowing the joint 5, the knuckle 1 and the wheel 2 to lift further toward a position as indicated by the broken line. FIG. 9 illustrates in broken line the position of parts of the bushings 17 and 23 when the joint 5, the knuckle 1 and the wheel 2 has lifted to the broken line position. In FIG. 9, the maximum angle through which the upper arm 6 can pivot about the link axis $L_U$ is represented by $\theta_{MAX}$. Thus, the magnitude of lift of the joint 5 can be determined as a function of the maximum angle $\theta_{MAX}$ and distance between the damper 27 and the link axis $L_U$.

Resilient deformation occurs within the bushings 17 and 23. The bushings 17 and 23 show low rigidity during pivotal motion about the pivot center $O_1$ or $O_2$. Thus, the characteristic of the suspension remains substantially unaltered although spring constant during vertical movement slightly increases and there is a small increase in toque applied to the suspension member 10 and the joint 5.

Figure 10:
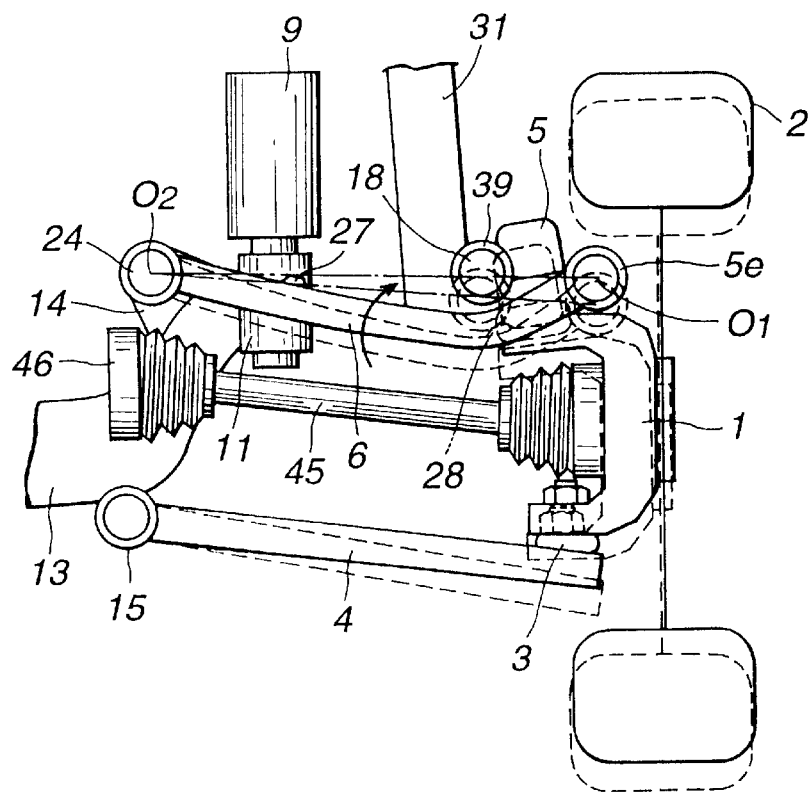
FIG. 10 is a similar view to FIG. 7 illustrating the position of parts when the wheel rebounds.

Referring to FIG. 10, when the front wheel 2 rebounds in response to input of a great force, the support sleeve 39 of the mounting bracket 33 of the strut 7 comes into interference with the upper link 6. In this case, the upper link 6 pivots about the link axis $L_U$ in a direction as indicated by an arrow in FIG. 10. This allows the joint 5, the knuckle 1 and the wheel 2 to further move vertically downwards from the fully drawn illustrated position to the broken line illustrated position. Thus, sufficiently large wheel stroke can be obtained during rebounding of the front wheel 2.

From the previous description, it will be understood that pivotal motion of the upper link 6 about the link axis $L_U$ provides further upward or downward movement of the wheel 2 thereby ensuring sufficiently long wheel stroke. Further, flexibility in layout design is enhanced and improved ride feel and steering maneuverability are ensured.

Appropriate balance between camber rigidity and lateral rigidity can be maintained by the resilient bushing 17 even if there is product to product variability which may baring about application of undesired forces, other than compression and extension forces, to the tipper link 6. Moment, in response to distance between the link axis $L_U$ and the kingpin axis $L_K$, is absorbed by deformation of the bushing 17.

The axis of the bushing 17 is at right angles to the link axis $L_U$. This arrangement reduces resilient deformation of the resilient bushing 17 when the upper link 6 is subject to compression or extension force. This also contributes to improvement in balance between the camber rigidity and the lateral rigidity.

The provision of the resilient dampers on the upper link 6 prevents direct contact of the upper link 6 with the side rail 9 or the support sleeve 39 of the mounting bracket 33. Thus, occurrence of undesired noise due to metal to metal collision is prevented. Peeling of paint or scratching of the surface is prevented thereby restraining rust from growing on the surface.

The axis $L_K$ of the joint 5 passes through the center of the ball joint 3 that interconnects the lower link 4 and the knuckle 1. In other words, the axis of the joint 5 is aligned with the kingpin axis. This allows smooth rotation of the knuckle 1 thereby causing predetermined displacements of the lower and upper links and the strut without causing any undesired input force or displacement to be applied to the bushings.

In the embodiment, the resilient dampers 27 and 28 are mounted on the upper surface of the upper link 6. The present invention is not limited to this example. If desired, they may be mounted to the side rail 9 and the support sleeve 39 of the bracket 33, respectively.

In the embodiment, the upper link 6 extends below the support sleeve 39 of the bracket 33. The present invention is not limited to this arrangement of the upper link 6. If desired, the upper link 6 may extend above the support sleeve 39 of the bracket 33. In this case, it is during bounding of the wheel 2 only that the upper link 6 comes into interference with the side rail 9. Under this condition, the upper link 6 pivots about the link axis $L_U$.

In the embodiment, the upper link 6 is spaced forward of the link axis $L_U$. The present invention is not limited to this arrangement. If desired, the upper link 6 may be spaced or offset rearward of the link axis $L_U$.

In the embodiment, the upper link 6 is arranged to come into interference with the side rail 9 or the support sleeve 39 of the bracket 33 during bounding or rebounding of the front wheel 2. If the upper link 6 is comes into interference with another member during bounding or rebounding of the front wheel 2, a resilient damper may be mounted to the upper link at a portion where it comes into contact with the other member. This arrangement provides substantially the same operation and effect as the first embodiment does.

In the previous embodiment, the bushings 17 and 23 are used to interconnect the upper link 6, the joint 5 and the suspension member 10. These bushings 17 and 23 may be replaced with ball joints, respectively. In this case, a line segment interconnecting the centers of balls of the ball joints is the upper link axis $L_U$.

In the previous embodiment, the lower link 4 is a rigid structure having a single outer end for connection with the knuckle 1 and two spilt inner ends for connection with the suspension member 10. If desired, two I-shaped links interconnected at their outer ends via a ball joint may be used as the lower link 4. In this case, the outer ends of the two I-shaped links are connected, via the ball joint, to the lower edge portion of the knuckle 1 and spaced apart inner ends of the I-shaped links are connected to the suspension member 10. With this arrangement, if the kingpin during steering of the road wheel is set as a hypothetical kingpin, the kingpin may be located the most appropriate place irrespective of the interference with the other parts such as a brake rotor.

What is claimed is:

1. A front suspension system for an automotive vehicle having a predetermined member, comprising:

a wheel support member carrying a wheel;

a lower link pivotally mounted to the predetermined member and connected at an outer end portion thereof to said wheel support member at a lower edge portion thereof for allowing pivotal motion of said wheel support member relative to said lower link;

a rotary joint coupled with said wheel support member at an upper edge portion thereof, said rotary joint having a joint axis of rotation;

a shock absorber connected at a lower end portion thereof to said joint; and an upper link connected at one end portion thereof to the predetermined member and connected at the opposite end portion thereof to said joint, said upper link having a link axis that crosses said joint axis, said upper link having an intermediate portion interconnecting said one end portion thereof and said opposite end portion thereof, said intermediate portion being spaced along a longitudinal axis of the vehicle from said link axis, said upper link being normally held, with a predetermined rigidity, in a predetermined positional relationship with said link axis, said upper link being movable to shift out of said predetermined positional relationship to allow said link axis to move beyond limits set by said predetermined positional relationship.

2. A front suspension system as claimed in claim 1, wherein said upper link is connected to said joint via a resilient bushing.

3. A front suspension system as claimed in claim 2, wherein an axis of said resilient bushing is at a right angle to said link axis.

4. A front suspension system as claimed in claim 3, wherein said upper link has mounted thereon a damper.

5. A front suspension system as claimed in claim 1, wherein said joint axis passes through a portion where said outer end portion of said lower link is connected to said lower edge portion of said wheel support member.

6. A front suspension system as claimed in claim 1, wherein the opposite end portion of said upper link is connected to said joint at a portion disposed laterally outward of said joint axis.

7. A front suspension system as claimed in claim 1, wherein said wheel support member is a knuckle.

8. A front suspension system as claimed in claim 7, further comprising:
   a tie rod connected to said knuckle.

9. A front suspension system as claimed in claim 1, wherein said upper link is disposed forward of said link axis.

10. A front suspension system as claimed in claim 1, wherein said joint axis intersects said link axis.

11. A front suspension system for an automotive vehicle including a side rail and a suspension member connected to the side rail and extending laterally inward of the vehicle, the front suspension system comprising:
   a wheel support member having an upper edge portion and a lower edge portion;
   a lower link pivotally mounted to the suspension member and extending below the side rail laterally outward, said lower link having an outer end portion, said lower link being connected at said outer end portion thereof to said lower edge portion of said wheel support member;
   a rotary joint coupled with said upper edge portion of said wheel support member; and
   an upper link having an inner end portion and an outer end portion, said upper link being pivotally mounted at said inner end portion thereof to said suspension member,
   said upper link extending below said side rail laterally outward, said upper link being connected at said outer end portion thereof to said rotary joint,
   said upper link having a link axis that crosses a joint axis;
   said upper link having an intermediate portion interconnecting said inner end portion thereof and said outer end portion thereof, said intermediate portion being spaced along a longitudinal axis of the vehicle from said link axis,
   said upper link being normally held, with a predetermined rigidity, in a predetermined positional relationship with said link axis,
   said upper link being so arranged as to come into abutting engagement with said side rail and be urged to pivot about said link axis to allow said link axis to move beyond limits set by said predetermined positional relationship.

12. A front suspension system as claimed in claim 11, further comprising:
   a damper between said upper link and the side rail.

13. A front suspension system as claimed in claim 12, further comprising;
   a shock absorber having a lower end portion; and
   a mounting bracket connected to said rotary joint and holding said lower end portion of said shock absorber.

14. A front suspension system as claimed in claim 13, wherein
   said upper link extends below said mounting bracket.

15. A front suspension system as claimed in claim 11, wherein said link axis and said joint axis intersect each other.

16. In an automotive vehicle:
   a side rail;
   a suspension member connected to said side rail and extending laterally inward of the vehicle;
   a wheel support member having an upper edge portion and a lower edge portion;
   a lower link pivotally mounted to the suspension member and extending below the side rail laterally outward, said lower link having an outer end portion, said lower link being connected at said outer end portion thereof to said lower edge portion of said wheel support member;
   a rotary joint coupled with said upper edge portion of said wheel support member;
   an upper link having an inner end portion and an outer end portion, said upper link being pivotally mounted at said inner end portion thereof to said suspension member,
   said upper link extending below said side rail laterally outward, said upper link being connected at said outer end portion thereof to said rotary joint;
   said upper link having a link axis that crosses a joint axis;
   said upper link having an intermediate portion interconnecting said inner end portion thereof and said outer end portion thereof, said intermediate portion being spaced along a longitudinal axis of the vehicle from said link axis,
   said upper link being normally held, with a predetermined rigidity, in a predetermined positional relationship with said link axis,
   said upper link being so arranged as to come into abutting engagement with said side rail and be urged to pivot about said link axis to allow said link axis to move beyond limits set by said predetermined positional relationship.

* * * * *